(12) United States Patent
Bensason et al.

(10) Patent No.: US 9,238,355 B2
(45) Date of Patent: Jan. 19, 2016

(54) STRETCH HOODS MADE FROM ULDPE-RICH FORMULATIONS

(75) Inventors: Selim Bensason, Au (CH); Andreas Mayer, Wollerau (CH); Antonio Manrique, Tarragona (ES)

(73) Assignee: Dow Global Technologies LLC, Midland, MI (US)

( * ) Notice: Subject to any disclaimer, the term of this patent is extended or adjusted under 35 U.S.C. 154(b) by 54 days.

(21) Appl. No.: 13/703,794

(22) PCT Filed: Jul. 5, 2011

(86) PCT No.: PCT/US2011/042950
§ 371 (c)(1),
(2), (4) Date: Dec. 12, 2012

(87) PCT Pub. No.: WO2012/003510
PCT Pub. Date: Jan. 5, 2012

(65) Prior Publication Data
US 2013/0092723 A1    Apr. 18, 2013

(51) Int. Cl.
*B32B 27/30* (2006.01)
*B32B 27/32* (2006.01)
*C08J 5/18* (2006.01)
*B65D 65/22* (2006.01)

(52) U.S. Cl.
CPC .............. *B32B 27/306* (2013.01); *B32B 27/32* (2013.01); *B65D 65/22* (2013.01); *C08J 5/18* (2013.01); *B32B 2553/00* (2013.01); *C08J 2323/04* (2013.01); *Y10T 428/31909* (2015.04)

(58) Field of Classification Search
CPC .............. B32B 1/00; B32B 1/02; B32B 1/08; B32B 27/00; B32B 27/08; B32B 27/30; B32B 27/306; B32B 27/32; B32B 27/327; Y10T 428/1352; Y10T 428/31909; Y10T 428/31935

USPC ............ 428/34.8, 34.9, 35.2, 36.6, 36.7, 500, 428/515, 519, 521, 523
See application file for complete search history.

(56) References Cited

U.S. PATENT DOCUMENTS

| | | | |
|---|---|---|---|
| 5,491,009 A | | 2/1996 | Bekele |
| 6,800,692 B2 * | | 10/2004 | Farley et al. .................. 525/191 |
| 2005/0037219 A1 | | 2/2005 | Ohlsson et al. |
| 2006/0094824 A1 | | 5/2006 | Roulin et al. |

FOREIGN PATENT DOCUMENTS

| | | |
|---|---|---|
| EP | 0459742 A2 | 12/1991 |
| EP | 1332868 | 8/2003 |
| JP | 05069483 | 3/1993 |
| WO | 0037543 | 6/2000 |
| WO | 2005/014672 A2 | 2/2005 |
| WO | 2009109367 | 9/2009 |

OTHER PUBLICATIONS

International Preliminary Report on Patentability for PCT App. No. PCT/US2011/042950 completed on Sep. 26, 2012.
International Search Report for PCT App. No. PCT/US2011/042950 mailed on Sep. 8, 2011.

* cited by examiner

*Primary Examiner* — Walter B Aughenbaugh
(74) *Attorney, Agent, or Firm* — Whyte Hirschboeck Dudek S.C.

(57) ABSTRACT

A polymeric, mono- or multilayer stretch hood packaging film with an overall density that does not exceed 0.920 g/cc includes: A. At least one core layer containing: 1. At least 50 wt % ULDPE with a density of 0.900 to 0.920 g/cc; and 2. Optionally at least one of: a. LDPE with a density of 0.915 to 0.925 g/cc, and b. EVA with a VA content of 4 to 20 wt %; and B. Optionally, two skin layers, each skin layer independently comprising: 1. At least 50 wt % ULDPE with a density of 0.900 to 0.920 g/cc; and 2. Optionally an LDPE with a density of 0.915 to 0.925 g/cc.

11 Claims, No Drawings

STRETCH HOODS MADE FROM ULDPE-RICH FORMULATIONS

CROSS REFERENCE TO RELATED APPLICATION

The present application is the national phase of PCT Patent Application No. PCT/US2011/042950 filed Jul. 5, 2011, which claims the benefit of PCT Patent Application No. PCT/ES2010/070457, filed Jul. 2, 2010. The entire content of which is incorporated by reference herein.

BACKGROUND OF THE INVENTION

1. Field of the Invention

This invention relates to stretch hoods. In one aspect the invention relates to mono- and multilayer stretch hoods while in another aspect, the invention relates to stretch hoods in which each of the layers is rich in ultra low density polyethylene (ULDPE).

2. Description of the Related Art

Polyolefin film formulations used in industrial stretch hood packaging applications require a suitable compromise between elastic recovery during packaging and load stability during storage and transportation. Elastic recovery in terms of resin design correlates to low or lower crystallinity resins, while load stability correlates to high or higher crystallinity resins.

Industrial stretch hood packaging film structures have been in commercial use for many years, and typically they are based on ethylene vinyl acetate (EVA) rich film formulations, i.e., formulations of which more than 50 weight percent (wt %) is EVA. The typical film design today is a 3-layer coextruded structure based on an EVA core layer (most commonly comprising an EVA with a content of units derived from vinyl acetate (VA) of 7.5 to 18 wt %), and skin layers based on metallocene-catalyzed linear low density polyethylene (mLLDPE) rich blends. This type of film structure performs well on packaging lines but at the expense of storage and transportation performance. Specifically, the residual elasticity of such films after the stretching and application process remains high and thus the load stability performance is limited, and EVA resins are weak on-pallet film protection properties such as puncture, tear propagation and dart drop impact performance.

WO 2009/109367 teaches coextruded film structures made using 10 to 95 wt % high melt index ratio (MIR), linear low density polyethylene (LLDPE) in the core layer of a multilayer, blown-extrusion film structure to provide easy processing and strong, highly transparent films. The LLDPE is characterized as having, among other properties, a density of 0.91 to 0.94 g/cm$^3$, a melt index (I$_2$) of 0.05 to 1 grams per 10 minutes (g/10 min), and a MIR (I$_{21}$/I$_2$) of more than 35. The skin layers of the multilayer film structure comprise at least 85 wt % linear polyethylene (PE) of which at least 75 wt % is an LLDPE with a melt index (MI) of less than 35 and no less than 15 wt % is a high pressure polyethylene (HPPE).

US 2005/0037219 teaches a blown film coextruded tube for use as a stretch hood film in which the core layer of the film comprises EVA or a polymer comprising units derived from ethylene, the polymer having (1) an MI of 0.05 to 20 g/10 min, (2) at least 10 per 1,000 C-atoms of short chain branches containing 5 carbon atoms or less, (3) a density of 0.90 to 0.94 g/cm$^3$, and (4) a relaxation time of at least 10 seconds. The skin layers comprise at least 60 wt % of LLDPE with a density of 0.91 to 0.94 g/cm$^3$ and hexane extractables of less than 1.5 wt %.

EP 1 332 868 B1 teaches a multilayer film which can be used in stretch hood applications, the film comprising a core layer (B) which comprises either (1) 10-90 wt % LLDPE with a density of less than 0.920 kg/m$^3$ and 90-10 wt % of a propylene copolymer comprising 0.3-18 wt % of units derived from ethylene and/or at least on C$_4$-C$_{12}$ α-olefin and 82-97.7 wt % units derived from propylene, or (2) 60-90 wt % of LLDPE with a density of less than 0.920 kg/m$^3$ and 40-10 wt % of an EVA comprising 5-35 wt % units derived from VA and 65-95 wt % units derived from ethylene. One skin layer (A) comprises low density polyethylene (LDPE) with a density of 910 to 940 kg/m3, a melting point of 106 to 125° C., and a melt flow ratio (190° C./2.16 kg, MFR) of 0.1 to 1 g/10 min. The other skin layer (C) comprises a composition of one or more of propylene/ethylene, propylene/butene and propylene/ethylene/α-olefin copolymers in which the composition has an MFR of 0.5 to 10 g/10 min and a melting temperature of 128 to 145° C.

WO 00/37543 teaches a three-layer film using a blend of a low density, metallocene-produced ethylene/α-olefin copolymer and a predominant amount of EVA with a high amount of VA content in the core layer, and a blend of an ethylene/α-olefin copolymer and a predominant amount of EVA with a low amount of VA content in the skin layers. The skin layers also comprise silicone dioxide as an anti-block friction modifier.

Of continuing interest is industrial stretch hood packaging film that exhibits both packaging and storage and transportation performance.

SUMMARY OF THE INVENTION

In one embodiment the invention is a mono- or multilayer film structure based on ULDPE-rich formulations. Such resins, which include current European commercial grades such as ATTANE SL 4100 and 4102 available from The Dow Chemical Company, offer better mechanical properties than incumbent EVA resins, e.g., they offer a significant performance advantage from a load storage and transportation perspective. This improved protection performance potential can also be combined with suitable elasticity and speed of recovery performance on packaging machines.

Important to the success of suitable packaging machine performance is the overall crystallinity of the film as expressed in layer and film densities with high density polymers exhibiting more crystalline character and with lower density polymers exhibiting more amorphous character. With reference to incumbent commercial films, the invention is based on ULDPE-rich core layers comprising either 100% by weight ULDPE or a blend comprising in weight percent predominantly ULDPE in combination with one or more of LDPE and EVA. This leads to a higher crystalline core layer which can then be compensated with a lower crystalline skin layer composition. Instead of mLLDPE-rich skin layers of the incumbent stretch hood packaging film, the skin layers of the films of the invention have reduced crystallinity due to their ULDPE-rich formulations.

In one embodiment the invention is a polymeric, mono- or multilayer stretch hood packaging film with an overall density that does not exceed 0.920 g/cc and comprising:

A. At least one core layer comprising:
 1. At least 50 wt % of ULDPE with a density of 0.900 to 0.920 g/cc; and
 2. Optionally at least one of:
  a. LDPE with a density of 0.915 to 0.925 g/cc, and
  b. EVA with a VA content of 4 to 20 wt %; and
B. Optionally, at least one skin layer comprising:
 1. At least 50 wt % of ULDPE with a density of 0.900 to 0.920 g/cc; and
 2. Optionally at least one of:
  a. LDPE with a density of 0.915 to 0.925 g/cc, and
  b. EVA with a VA content of 4 to 20 wt %.

In one embodiment the film consists of a single or monolayer film.

In one embodiment the film consists of two film layers. In one two-layer film embodiment, one layer is a skin layer and the other layer is a core layer. In one two-layer film embodiment both the layers are skin layers. In one two-layer film embodiment both layers are core layers. In one two-layer film embodiment, both layers are compositionally the same.

In one embodiment the film comprises three film layers. In one three-layer film embodiment, the film comprises one core layer and two skin layers. In one three-layer film embodiment, the film comprises two core layers and one skin layer. In one three-layer film embodiment, the each layer is compositionally the same as the other two layers.

In one embodiment the film comprises more than three film layers. In one more than three layer embodiment, the film comprises multiple core layers and two skin layers. In one more than three layer embodiment, each core layer has the same composition as the other core layers. In one more than three layer embodiment, at least one core layer is different from the other core layers. In one more than three layer embodiment, each skin layer is the same compositionally as the other skin layer. In one embodiment each skin layer is different compositionally from the other skin layer. In one more than three layer embodiment, the film comprises at least one layer other than a core or skin film layer.

DETAILED DESCRIPTION OF THE PREFERRED EMBODIMENT

Definitions

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, etc., is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the proportional amounts of core and skin layers and the proportional amounts of various resins in a layer.

"Multilayer" film and like terms mean a film comprising two or more film layers. Each film layer can be the same or different in composition and thickness.

"Facial surface" and like terms are used in distinction to "edge surface". For example, if rectangular in shape or configuration, a layer, e.g., film, will comprise two opposing facial surfaces joined by four edge surfaces (two opposing pairs of edge surfaces, each pair intersecting the other pair at right angles). If circular in configuration, then the layer will comprise two opposing facial surfaces joined by one continuous edge surface.

"Composition" and like terms mean a mixture or blend of two or more components.

"Polymer blend" and like terms mean a blend of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

The term "polymer" (and like terms) is a macromolecular compound prepared by reacting (i.e., polymerizing) monomers of the same or different type. "Polymer" includes homopolymers and interpolymers.

"Interpolymer" means a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Polyolefin", "olefin-based polymer" and like terms means a polymer containing, in polymerized form, a majority weight percent of an olefin, for example ethylene or propylene, based on the total weight of the polymer. Nonlimiting examples of olefin-based polymers include ethylene-based polymers and propylene-based polymers.

"ULDPE-rich" and like terms mean that a formulation, film layer, etc., comprises more than 50 wt % ULDPE.

"Crystalline" and like terms as applied to a polymer mean a polymer or segment of a polymer that possesses a first order transition or crystalline melting point (Tm) as determined by differential scanning calorimetry (DSC) or equivalent technique. The term may be used interchangeably with the term "semicrystalline". The crystals may exist as stacks of closely packed lamellar crystals, lamellae forming the arms of spherulites, or as isolated lamellar or fringed micellar crystals.

"Amorphous" and like terms as applied to a polymer mean a polymer lacking a crystalline melting point as determined by DSC or equivalent technique.

ULDPE

These thermoplastic polymers are ethylene/α-olefin interpolymers. The α-olefin is typically one or more, preferably one, of a $C_{3-20}$ linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, are α-olefins and can be used in place of some or all of the α-olefins described above. Illustrative polyolefin copolymers include ethylene/propylene, ethylene/butene, ethylene/1-hexene, ethylene/1-octene, ethylene/styrene, and the like. Illustrative terpolymers include ethylene/propylene/

1-octene, ethylene/propylene/butene, ethylene/butene/1-octene, and ethylene/butene/styrene.

The ULDPE used in the practice of this invention has a density as measured by ASTM D792 of 0.900 to 0.920, typically of 0.903 to 0.915 and even more typically of 0.903 to 0.913, g/cc.

Specific examples of ULDPE useful in this invention include ATTANE® 4606G, 4647G, SL 4100G, SL 4101G and SL 4102G; DOWLEX® 2103, 2045, 5056 and 4056; and AFFINITY® 1880 ethylene/1-octene or ethylene/1-hexene copolymers made by The Dow Chemical Company).

LDPE

The LDPE used in the practice of this invention can be manufactured by known processes, or can be obtained commercially. The LDPE is manufactured using a high pressure, free radical polymerization process. Alternatively, LDPE suitable for use in the practice of the present invention can be obtained commercially from various manufacturers. For example, LDPE can be purchased from The Dow Chemical Company as DOW® LDPE 150E, 303, 310, 421, 515, 535 and many other grades, and from LyondellBasell Industries under the trade names of LUPOLEN® and PETROTHENE®. The LDPE suitable for use in this invention typically has a MI (melt index, ASTM D1238, Condition 190/2.16) of 4 to 15 grams per 10 minutes (g/10 min) and a density of 0.915-0.925 g/cc (ASTM D792).

EVA

Ethylene vinyl acetate is a well known polymer and is readily available commercially, e.g., ELVAX® EVA resins available from DuPont. The vinyl acetate content of the EVA resins used in the practice of this invention can range widely, but typically the minimum vinyl acetate content is at least 5 wt %. The maximum vinyl acetate content of the EVA resins used in the practice of this invention can also range widely, but typically it is not greater than 20 wt %.

Core Layer

The core layer or layers of the multilayer stretch hood packaging film of this invention comprises a majority of ULDPE and, optionally, a minority of one or more of LDPE and EVA. In one embodiment the core layer comprises 100 wt % ULDPE. In one embodiment the core layer comprises 90, 75 or 50 wt % or more ULDPE with one or more of LDPE and EVA comprising no more than 50, typically no more than 25 and even more typically not more than 10, wt % of the layer. In one embodiment the core layer, or each core layer if more than one, comprises at least 50 wt % ULDPE with a density of 0.900 to 0.920 g/cc, and, optionally, at least one of LDPE with a density of 0.915 to 0.925 g/cc and EVA with a VA content of 5 to 20 wt %.

The core layers of the stretch hood films of this invention need not always be situated as an inner layer of the film. As non-limiting examples, if the stretch hood film is a mono- or two-layer film, then the core film layer will necessary constitute an outer layer of the stretch hood film.

Skin Layers

The skin layers of the multilayer stretch hood packaging film of this invention also comprise a majority of ULDPE and, optionally, a minority of LDPE. In one embodiment either or both skin layers comprise 100 wt % ULDPE. In one embodiment either or both skin layer comprise 90, 75 or 50 wt % or more ULDPE with LDPE comprising no more than 50, typically no more than 25 and even more typically not more than 10, wt % of either or both layers. In one embodiment each skin layer comprises at least 50 wt % ULDPE with a density of 0.900 to 0.920 g/cc, and, optionally, LDPE with a density of 0.915 to 0.925 g/cc. The composition of one skin layer can be the same or different from the composition of the other skin layer.

The skin layers of the stretch hood films of this invention need not always be situated as an exterior layer of the film. As a non-limiting example, if the stretch hood film is a multilayer film comprising one or more layers other than a core or skin layer, e.g., a moisture or oxygen barrier film layer such as a layer comprising polyvinylidene chloride or ethylene vinyl alcohol, then the barrier film layer may be situated as an external or outer layer. Preferably, the skin film layers of this invention are situated in the stretch hood film as outer layers.

Film Layers Other than Core and Skin Layers

In one embodiment of the invention, a multilayer, stretch hood packaging film comprises at least one of a core and skin layer as described above and one or more additional film layers. These additional film layers are incorporated for various purposes, e.g., barriers to water and/or oxygen, mechanical strength, chemical resistance, etc., and are typically incorporated as an interior layer of the packaging film. These layers, if present, are used in known ways and in known amounts.

Multilayer Stretch Hood Packaging Film

The films of this invention comprise at least one core layer and, optionally, two skin layers. In a three-layer film (A/B/C), one facial surface of one skin layer (A) is in direct contact with one facial surface of the core layer (B), while the other facial surface of the core layer (B) is in direct contact with one facial surface of the other skin layer (C). Skin layers A and C can be the same or different. In these three-layer film structures, the core layer typically comprises 50 or more weight percent of the entire film, and the weight of the combined skin layers is less than 50 wt % of the entire film, typically with each skin layer comprising the same weight percent of the entire film, e.g., if the core layer comprises 60 wt % of the film, then each skin layer comprises 20 wt % of the film (although each skin layer can comprise a different weight percent of the film, e.g., 25 and 15 wt %).

Layers may be interposed between the core and skin layers for any of a number of reasons, e.g., performance, economy, etc. In one embodiment the film structure comprises 5, 7 or more layers. While these alternative constructions comprise only two skin layers, they may comprise more than one core layer. For example, a five-layer film structure may comprise one central core layer in contact with two opposing adhesive layers each of which is in direct contact with one skin layer, e.g., A/D/C/D/C with the adhesive layer designated as D. The two skin layers can be the same or different and the two adhesive layers can be the same or different. In an alternative five-layer construction, the layers in contact with the skin layers are each a core layer each of which is in contact with a separating central layer, e.g., A/B/D/B/C with the central layer designated D. Here too, each skin layer (A, C) can be the same or different, and each core layer (B) can be the same or different. In each of these constructions comprising more than three layers, the core layer, or combination of core layers if more than one, comprises at least 50 wt % of the film weight.

The density of the film, as opposed to the density of the individual layers, is not greater than 0.920, typically not greater than 0.917 and even more typically not greater than 0.912, g/cc. The average density of a given piece of film can be measured by first cutting the film using a knife or scissors into small pieces or strips in the range of a few millimeters in size, typically close to the size of raw material pellets, e.g., of 5 to 10 mm. These film pieces are then compression molded into plaques of length by width by thickness dimensions in millimeters of 32 by 32 by 2 according to international standards ISO 293 and ISO 187. The plaques are cut using a knife into a suitable size, and the density is measured using the procedure of ASTM D792-08. Isopropanol is used as the liquid for the Arquimedes method. Three samples are taken for an average density reading in g/cm$^3$. Annealed density is measured between 48 and 80 hours after molding the plaque. Quick density reading is measured between 15 minutes and 1 hour after molding the plaque.

The thickness of the films is of 50 to 200, preferably 70 to 140, microns (μm), and the thickness is typically determined by the intended use and properties of the film. The thickness of each film layer is typically no more than 30 to 80 percent of the total thickness of the film, and the thickness of the core layer is typically greater than that of either individual skin layer.

Each layer of the film may comprise one or more additives and/or fillers such as, but not limited to, anti-block or slip agents, tackifiers, antioxidants, colorants, UV-stabilizers, processing aids and the like. These additives and fillers are use in known amounts and in known ways.

The films are made by known methods, e.g., co-extrusion or lamination, and used in known applications.

Representative stretch hood packaging films include, but are not limited to,
A. A monolayer film comprising 100 to 50 wt % ULDPE with a density of 0.900-0.920 g/cc, and 0 to 50 wt % of at least one of LDPE with a density of 0.915-0.925 g/cc and EVA comprising 5-20 wt % vinyl acetate; and
B. A three-layer film comprising:
  1. Two skin layers each comprising:
    a. 10-25 wt % of the film, and
    b. 100 to 50 wt % ULDPE with a density of 0.900-0.920 g/cc, and 0 to 50 w % LDPE with a density of 0.915-0.925 g/cc, and
  2. A core layer comprising:
    a. 80-50 wt % of the film, and
    b. 100 to 50 wt % ULDPE with a density of 0.900-0.920 g/cc, and 0 to 50 w % LDPE with a density of 0.915-0.925 g/cc; and
C. A three-layer film comprising:
  1. Two skin layers each comprising:
    a. 10-25 wt % of the film, and
    b. 100 to 50 wt % ULDPE with a density of 0.905 g/cc, and 0 to 50 wt % LDPE with a density of 0.915-0.925 g/cc,
  2. A core layer comprising:
    a. 80-50 wt % of the film, and
    b. 100 to 50 wt % ULDPE with a density of 0.905 g/cc and 0 to 50 wt % EVA with 5-20 wt % of vinyl acetate;
D. A five-layer film comprising:
  1. Two skin layers each comprising:
    a. 10-25 wt % of the film, and
    b. 100 to 50 wt % ULDPE with a density of 0.900-0.920 g/cc, and 0 to 50 w % LDPE with a density of 0.915-0.925 g/cc, and
  2. Two core layers each comprising:
    a. 10-25 wt % of the film, and
    b. 100 to 50 wt % ULDPE with a density of 0.900-0.920 g/cc, and 0 to 50 w % LDPE with a density of 0.915-0.925 g/cc, and
  3. One core layer comprising:
    a. 70-25 wt % of the film, and
    b. 100 to 50 wt % ULDPE with a density of 0.900-0.920 g/cc, and 0 to 50 w % LDPE with a density of 0.915-0.925 g/cc;
F. A five-layer film comprising:
  1. Two skin layers each comprising:
    a. 10-25 wt % of the film, and
    b. 100 to 50 wt % ULDPE with a density of 0.900-0.920 g/cc, and 0 to 50 wt % of at least one of LDPE with a density of 0.915-0.925 g/cc, and EVA comprising 5-20 wt % of vinyl acetate;
  2. Two core layers each comprising:
    a. 10-25 wt % of the film, and
    b. 100 to 50 wt % ULDPE with a density of 0.900-0.920 g/cc, and 0 to 50 wt % of at least one of LDPE with a density of 0.915-0.925 g/cc, and EVA comprising 5-20 wt % of vinyl acetate;
  3. One core layer comprising:
    a. 70-25 wt % of the film, and
    b. 100 to 50 wt % ULDPE with a density of 0.900-0.920 g/cc, and 0 to 50 w % of at least one of LDPE with a density of 0.915-0.925 g/cc; and EVA comprising 5-20 wt % of vinyl acetate;
G. A polymeric, mono- or multilayer stretch hood packaging film with an overall density that does not exceed 0.915 g/cc and comprising:
  1. At least one core layer comprising:
    a. At least 50 wt % ULDPE with a density of 0.900 to 0.920 g/cc; and
    b. Optionally at least one of:
      i. LDPE with a density of 0.915 to 0.925 g/cc, and
      ii. EVA with a VA content of 4 to 20 wt %; and
  2. Optionally, two skin layers, each skin layer independently comprising:
    a. At least 50 wt % ULDPE with a density of 0.900 to 0.920 g/cc; and
    b. Optionally an LDPE with a density of 0.915 to 0.925 g/cc; and
H. A polymeric, multilayer stretch hood packaging film with an overall density that does not exceed 0.915 g/cc and comprising:
  1. At least one core layer comprising:
    a. At least 50 wt % ULDPE each with a density of 0.900 to 0.920 g/cc; and
    b. Optionally at least one of:
      i. LDPE with a density of 0.915 to 0.925 g/cc, and
      ii. EVA with a VA content of 4 to 20 wt %; and
  2. Two skin layers, each skin layer independently comprising:
    a. At least 50 wt % of ULDPE each with a density of 0.900 to 0.920 g/cc; and
    b. Optionally an LDPE with a density of 0.915 to 0.925 g/cc.

Specific Embodiments

Performance Screening of Key Resins

Selected EVA resins with a typical VA level between 5 and 18 wt % and as known in the market for the production of commercial stretch hood film structures are used as reference performance grades. Such resins are typically used in the core layer/s of typically 3- to 5- or more layer co-extruded films at total film composition levels typically above 30 and even more typical at levels above 50 wt %:

Resin A: GREENFLEX® FD20 EVA copolymer with 5 wt % VA, MI$_2$ of 0.5 g/10 min (ASTM D1238)
Resin B: NEXXSTAR* 00111 EVA copolymer with 7.5 wt % VA, MI$_2$ of 0.5 g/10 min
Resin C: GREENFLEX® FF45 EVA copolymer with 14 wt % VA, MI2 of 0.7 g/10 min (ISO1133)

Resin D: GREENFLEX® FD53 EVA copolymer with 17 wt % VA, MI2 of 0.47 g/10 min (ASTM D1238)

to be compared with these ULDPE grades:

Resin E: ATTANE SL 4100G Ultra low density octene PE copolymer with density of 0.912 g/cc and $MI_2$ of 1.0 g/10 min Resin F: ATTANE SL 4102G Ultra low density octene PE copolymer with density of 0.905 g/cc and $MI_2$ of 1.0 g/10 min GREENFLEX® is a registered trademark of POLIMERI EUROPA NEXXSTAR* is a registered trademark of ExxonMobil Chemical Mono-layer film structures from all these resins are produced on a Dr. Collin co-extrusion blown-film line with a standard 30 mm diameter single screw extruder and a 60 mm diameter mono-layer die:

| | |
|---|---|
| Film thickness monolayer | 60 μm |
| Output monolayer | 7 kg/h |
| Blow-up ratio | 3:1 |
| Die diameter | 60 mm |
| Die gap | 1.2 mm |
| Frost line height | ~200 mm |
| Melt temperatures | ~210° C. |

Since the resins used in these examples have a relatively low degree of crystallinity, some of the films develop quite distinct blocking effects during fabrication. Anti-block additives are not added to the film formulations. In cases, when, after collapsing a bubble, it is not possible to separate the layers, the problem is solved by collapsing films of 30 μm wall thickness and introducing separation sheets into the winder.

Determination of elastic recovery levels is a key criterion to describe packaging machine performance under laboratory conditions. Data can be generated according to standard test ASTM D5459-95. The measurements are carried out at 50% strain levels. Test details: a 127×15 mm specimen is cut from the film in cross direction and placed between the clamps at 127 mm separation. The sample is then stretched at a speed of 127 mm/min up to 50% of final strain and held there for 60 seconds (s) for relaxation. Then the crosshead is returned to the original clamps separation and the specimen is held there at 0% strain for another relaxation period of 180 s before the second elongation cycle is started. The elastic recovery values can then be determined as described in the test standard. Data of the selected resins and films made there from are measured in film cross direction and show a comparable performance range:

Resin A: 88.5%
Resin B: 89.1%
Resin C: 89.4%
Resin D: 89.9%
Resin E: 87.9%
Resin F: 89.2%

Besides elastic recovery values, these other film parameters are chosen to describe key packaging performance behavior:

Dart drop impact—method A: ISO 7765-1
Elmendorf tear propagation (in cross=CD and machine direction=MD): ASTM D792
Puncture resistance: ASTM D-5748

Dart drop impact values of selected resins and films made there from:

Resin A: 454 g
Resin B: 697 g
Resin C: 1056 g
Resin D: 1086 g
Resin E: 1679 g
Resin F: greater then 2500 g Elmendorf tear propagation values (CD/MD) of selected resins and films made there from:

Resin A: 158/102 g
Resin B: 98/62 g
Resin C: 113/73 g
Resin D: 118/74 g
Resin E: 1340/1180 g,
Resin F: 1140/1070 g Puncture resistance of selected resins and films made there from:

Resin A: 6.4 $J/cm^3$
Resin B: 7.7 $J/cm^3$
Resin C: 14.5 $J/cm^3$
Resin D: 17.5 $J/cm^3$
Resin E: 10.6 $J/cm^3$
Resin F: 15.8 $J/cm^3$ Comparative Evaluation of Industry Film Structures Three-layer coextruded film structures are produced on a Hosokawa Alpine extrusion line. Extrusion line configuration:

Extruders: 2×65 (A and C skin layers position)+1×90 (B core layer position)/mm, all 30 L/D
Die: 300 (diameter)×1.5 (gap)/mm
Melt temperatures: approx. 220° C.
Bubble cooling: elevated single air ring, IBC
Haul-off: side gussets up to 400 mm
Output rate: total=350 kg/h; 2×70 kg/h for skin layers and 210 kg/h for core layer
Film thickness: 100 micron
Layer distribution: A-B-C=20-60-20%
Additional resins used:

Resin G: ESCORENE* FL 00014 EVA copolymer with 14 wt % VA, $MI_2$ of 0.25 g/10 min
Resin H: ESCORENE* FL 00218 EVA copolymer with 18 wt % VA, $MI_2$ of 1.7 g/10 min ESCORENE* is a registered trademark of ExxonMobil Chemical Resin I: Dow LDPE 150E Low density PE with D of 0.920 g/cc and $MI_2$ of 0.25 g/10 min
Resin K: DOWLEX SL 2103 Linear low density octene PE copolymer with a density of 0.917 g/cc and $MI_2$ of 0.7 g/10 min
Resin L: VERSIFY 2300 Ethylene-Propylene Elastomer with a density of 0.8665 g/cc and $MI_2$ of 2.0 (230° C.)

Film design parameters:

All films: A-B-C=20-60-20% layer split
Film 1: 1.1 (comparative)
Skin layers A=C: blend of Resin K (79%)+Resin I (17%)+ Masterbatches (3% Antiblock+1% processing aid)
Core layer B: Resin G
Film: 1.2 (comparative)
Skin layers A=C: blend of Resin K (79%)+Resin I (17%)+ Masterbatches (3% Antiblock+1% processing aid)
Core layer B: Resin H
Film Inventive 1: 2.2
Skin layers A=C: blend of Resin K (79%)+Resin I (16%)+ Masterbatches (3% Antiblock+1% slip+1% processing aid)
Core layer B: blend of Resin F (70%) and Resin L (30%)
Film Inventive 2: 3.1
Skin layers A=C: blend of Resin F (79%)+Resin I (17%)+ Masterbatches (3% Antiblock+1% processing aid)
Core layer B: blend of Resin F (70%) and Resin L (30%)

Film Inventive 3: 4.2
Skin layers A=C: blend of Resin F (79%)+Resin I (17%)+ Masterbatches (3% Antiblock+1% processing aid)
Core layer B: blend of Resin F (70%) and Resin I (30%)
Key Properties of all Specified Film Structures:
Elastic recovery in MD and CD:
Film Comparative 1: 73.8/76.5%
Film Comparative 2: 74.5/76.2%
Film Inventive 1: 67.8/70.1%
Film Inventive 2: 73.8/75.5%
Film Inventive 3: 67.1/70.4
Dart drop impact—important note=long dart type B:
Film Comparative 1: 1452 g
Film Comparative 2: 1194 g
Film Inventive 1: 1905 g
Film Inventive 2: 2384 g
Film Inventive 3: 1212 g
Elmendorf tear propagation (in MD and CD):
Film Comparative 1: 1050/1740 g
Film Comparative 2: 532/836 g
Film Inventive 1: 1390/2160 g
Film Inventive 2: 1380/1990 g
Film Inventive 3: 1240/1830 g
Puncture resistance—elongation:
Film Comparative 1: 91 mm
Film Comparative 2: 92 mm
Film Inventive 1: 99 mm
Film Inventive 2: 160 mm
Film Inventive 3: 133 mm Although the invention has been described with certain detail through the preceding description of the preferred embodiments, this detail is for the primary purpose of illustration. Many variations and modifications can be made by one skilled in the art without departing from the spirit and scope of the invention as described in the following claims.

What is claimed is:

1. A polymeric, multilayered stretch hood packaging film with an overall density that does not exceed 0.920 g/cc and comprising:
   A. A core layer comprising:
      1. 80 to 50 wt % of the film; and
      2. consisting essentially of from less than 100 to 50 wt % ULDPE with a density of 0.900 to 0.920 g/cc and from greater than 0 to 50 wt % EVA with a vinyl acetate content of 5 to 20 wt %; and
   B. Two skin layers each comprising:
      1. 10 to 25 wt % of the film; and
      2. from less than 100 to 75 wt % ULDPE with a density of 0.900 to 0.920 g/cc, and no greater than 25 wt % LDPE with a density of 0.915 to 0.925 g/cc.

2. The film of claim 1 in which the ULDPE comprises at least 75 wt % of the core layer.

3. The film of claim 1 in which the skin layers are the same.

4. The film of claim 1 in which the skin layers are different.

5. The film of claim 1, wherein the ULDPE is present in the core layer in an amount of 70 wt %.

6. The film of claim 1, wherein the melt index of the ULDPE in the skin layers and the core layer is 1 g/10 min.

7. The film of claim 1, wherein the density of the ULDPE is from 0.903 to 0.913 g/cc.

8. The film of claim 1, wherein the density of the ULDPE is 0.905.

9. A polymeric, multilayered stretch hood packaging film with an overall density that does not exceed 0.920 g/cc and comprising:
   A. Two skin layers each comprising:
      1. 10-25 wt % of the film, and
      2. from less than 100 wt % to 75 wt % ULDPE with a density of 0.900 to 0.920 g/cc and no greater than 25 wt % of at least one of LDPE with a density of 0.915-0.925 g/cc and EVA comprising 5-20 wt % of vinyl acetate;
   B. Two core layers each comprising:
      1. 10-25 wt % of the film, and
      2. 100 to 50 wt % ULDPE with a density of 0.900 to 0.920 g/cc and 0 to 50 wt % of at least one of LDPE with a density of 0.915-0.925 g/cc and EVA comprising 5-20 wt % of vinyl acetate; and
   C. One core layer comprising:
      1. 70-25 wt % of the film, and
      2. consisting essentially of from less than 100 wt % to 50 wt % ULDPE with a density of 0.903 to 0.913 g/cc and from greater than 0 to 50 wt % of EVA comprising 5-20 wt % of vinyl acetate.

10. A polymeric, multilayered stretch hood packaging film with an overall density that does not exceed 0.920 g/cc and comprising:
    A. At least one core layer comprising:
       1. at least 50 wt % of ULDPE with a density of 0.900 to 0.920 g/cc; and
       2. from greater than 0 to 50 wt % EVA with a vinyl acetate content of 5 to 20 wt %; and
    B. Two skin layers each comprising:
       1. at least 50 wt % of ULDPE with a density of 0.900 to 0.920 g/cc; and
       2. optionally, an LDPE with a density of 0.915 to 0.925.

11. The film of claim 10, wherein the core layer consists essentially of the ULDPE and the EVA.

* * * * *